US006965851B2

(12) United States Patent
Tillotson

(10) Patent No.: US 6,965,851 B2
(45) Date of Patent: Nov. 15, 2005

(54) APPARATUS AND METHOD FOR ANALYZING PERFORMANCE OF A MOBILE NETWORK

(75) Inventor: Brian Jay Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 764 days.

(21) Appl. No.: 09/995,180

(22) Filed: Nov. 26, 2001

(65) Prior Publication Data

US 2003/0101034 A1 May 29, 2003

(51) Int. Cl.[7] .......................................... G06F 17/50
(52) U.S. Cl. ...................... 703/13; 455/446; 455/561; 455/448; 455/562; 370/330; 370/389; 370/238; 370/255
(58) Field of Search ............................ 703/21, 13, 17; 455/561, 446, 67.11, 434, 448, 565; 370/330, 370/389, 238, 255, 342, 316, 254, 442; 709/241, 709/224

(56) References Cited

U.S. PATENT DOCUMENTS

| | | | | |
|---|---|---|---|---|
| 5,794,128 A * | 8/1998 | Brockel et al. | ........... | 455/67.11 |
| 5,953,676 A * | 9/1999 | Berry et al. | ................. | 455/564 |
| 6,018,659 A | 1/2000 | Ayyagari et al. | | |
| 6,084,864 A * | 7/2000 | Liron | ........................ | 370/316 |
| 6,104,712 A * | 8/2000 | Robert et al. | ................ | 370/389 |
| 6,111,857 A * | 8/2000 | Soliman et al. | ............. | 370/254 |
| 6,134,514 A * | 10/2000 | Liu et al. | ....................... | 703/17 |
| 6,272,450 B1 * | 8/2001 | Hill et al. | ....................... | 703/13 |
| 6,308,072 B1 * | 10/2001 | Labedz et al. | ............... | 455/448 |
| 6,377,561 B1 * | 4/2002 | Black et al. | ................. | 370/330 |
| 6,442,615 B1 * | 8/2002 | Nordenstam et al. | ........ | 709/241 |
| 6,611,867 B1 * | 8/2003 | Bowman-Amuah | ......... | 709/224 |
| 6,643,526 B1 * | 11/2003 | Katz | ........................ | 455/562.1 |
| 6,829,222 B2 * | 12/2004 | Amis et al. | ................. | 370/238 |
| 6,834,180 B1 * | 12/2004 | Marshall | ................... | 455/67.11 |
| 6,853,852 B1 * | 2/2005 | Park et al. | .................... | 455/561 |
| 2001/0045494 A1 * | 11/2001 | Higgins | ................... | 244/158 R |
| 2002/0018448 A1 * | 2/2002 | Amis et al. | ................. | 370/255 |
| 2002/0022482 A1 * | 2/2002 | Ishikawa | ..................... | 455/434 |
| 2002/0067736 A1 * | 6/2002 | Garcia-Luna-Aceves et al. | ............... | 370/442 |
| 2002/0128045 A1 * | 9/2002 | Chang et al. | ............... | 455/562 |
| 2002/0168983 A1 * | 11/2002 | Kumaran et al. | ........... | 455/446 |
| 2003/0086405 A1 * | 5/2003 | Silva et al. | ................. | 370/342 |
| 2003/0097410 A1 * | 5/2003 | Atkins et al. | ................ | 709/206 |

OTHER PUBLICATIONS

Sanchez M et al: "ANEJOS: a Java based simulator for ad hoc networks", Future Generations Computer Systems, Elsevier Science Publishers. Amsterdam, NL, vol. 17, No. 5, Mar. 2001, pp. 573-583, XP004317416; ISSN: 0167-739X.

(Continued)

Primary Examiner—Leo Picard
Assistant Examiner—Kandasamy Thangavelu
(74) Attorney, Agent, or Firm—Harness Dickey & Pierce P.L.C.

(57) ABSTRACT

An apparatus and method for simulating a mobile network having node based phased array antennas communicating through TDMA and non-TDMA links, and the network being operated under a user specified data-traffic model. The invention applies link censoring to links for avoiding self-interference. The invention computes and outputs selected network parameters. The invention facilitates simulation of prototype network designs and network performance analysis under user specified operating conditions.

12 Claims, 3 Drawing Sheets

OTHER PUBLICATIONS

Mishra P et al: "Ethersim: a simulator for wireless and mobile networks"; Global Telecommunications Conference, 1996. GLOBECOM'96. Communications: The Key to Global Prosperity London, UK 18-22; Nov. 1996, New York, NY, USA, IEEE, US, Nov. 18, 1996, pp. 2018-2027, XP010220230; ISBN: 0-7803-3336-5.

Chu Rui Chang et al: "Experimental investigations of PCS interference between CDMA and GSM"; Vehicular Technology Conference, 1999 IEEE 49$^{th}$ Houston, TX, USA May 16-20, 1999, Piscataway, NJ, USA, IEEE, US May 16, 1999 (1999095016), pp. 772-776, XP010341950; ISBN: 0-7803-5565-2.

* cited by examiner

APPARATUS AND METHOD FOR ANALYZING PERFORMANCE OF A MOBILE NETWORK

FIELD OF THE INVENTION

The present invention relates to network simulation and more particularly to simulated performance analysis of a large-scale mobile network.

BACKGROUND OF THE INVENTION

Network simulation systems provide convenient and effective tools for analyzing network performance. Simulation is employed for rapid prototyping of network topology, and for network performance analysis under simulated operating conditions.

A typical simulation system provides better results when it is customized for a specific network design. Important considerations in designing a simulation system are the underlying network size, component characteristics, and operational parameters. Many network applications involving defense communications, distribution tracking systems, etc., require large scale mobile networks with high bandwidth and throughput. Such networks are generally custom designed and require specialized and application specific simulation systems.

Modern approaches to mobile network design employ performance enhancing architectures. For example, architectures like TDMA and CDMA multiplex the data channel to achieve high data rates. Large scale networks having performance enhancing architectures and significant inter-node distance need improved simulators.

Accordingly, there is a need for a simulation system and method designed for a large scale mobile network. More specifically there is a need for such a simulation system and method capable of simulating high speed data transfer among distant scattered nodes. A further need exists to output the results of the simulation system and method in a user friendly manner.

SUMMARY OF THE INVENTION

The present invention is directed to a simulation system for a mobile communication network. In a preferred form the network simulates multiple nodes which are interconnected by synchronous and TDMA links. The nodes have phased array antennas for communicating among the nodes. At the start of simulation, the nodes, synchronous links and TDMA links are initialized by appropriate controllers. Some of the synchronous and TDMA links are censored, i.e. eliminated, to avoid network self-interference. A user specified data-traffic model is stored in a memory associated with the simulation system. The stored data-traffic model is applied to the simulated network. Network traffic is then analyzed for the stored data-traffic model and selected network parameters are calculated. Thereafter, the parameters are outputted through an output device. A variety of output devices including a display device can be effectively employed for outputting network parameters.

In one of the preferred embodiments of the invention a link censor is employed to avoid self-interference in the synchronous and TDMA links. In another embodiment the synchronous link controller initializes and manages the synchronous links; the TDMA link controller initializes and manages the TDMA links.

In one of the preferred embodiments the invention is implemented as a computer program. Another preferred embodiment implements the invention in a hardware system. Yet another preferred embodiment implements the invention as a combination of hardware and software elements.

In a preferred embodiment the network analyzer performs the required network analysis and computing performance parameters. In another preferred embodiment the user specified data traffic model is customizable by the user.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
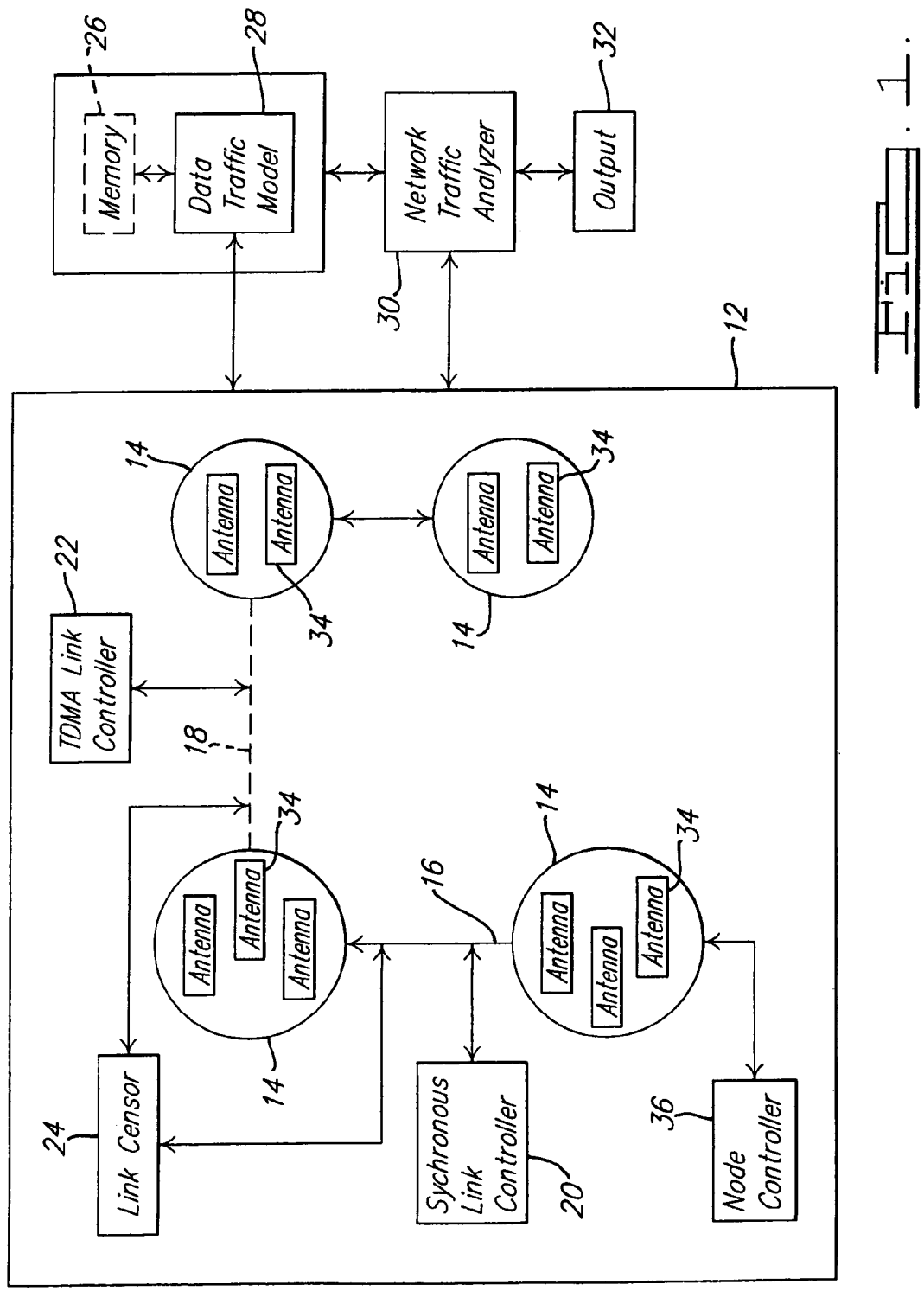
FIG. 1 is a block diagram representing a simulation system in accordance with a preferred embodiment of the present invention.

Referring to FIG. 1, there is shown a simulation system 10 in accordance with a preferred embodiment of the present invention. The simulation system 10 consists of a simulated network 12 having simulated nodes 14 interconnected by synchronous communication links 16 and TDMA (Time Division Multiple Access) communication links 18. A synchronous link controller 20 is used to set up initial parameters for the synchronous links 18. A TDMA link controller 22 is used to set up the initial parameters for the TDMA links 18. The synchronous links 16 serve to provide synchronous communication channels among the simulated nodes 14. A link censor 24 simulates link censoring to avoid self-interference for synchronous links 16 and TDMA links 18.

The simulated nodes 14 are the basic building blocks of the simulation system 10. Simulated nodes 14 are the sources and sinks of the communications traffic in the network 12. The inter-node data-rate between any two of the simulated nodes 14 at a given instance is preferably about 100 Mbps. The distance between any two of the simulated nodes 14 having direct links could be up to 900 km, or possibly even longer.

High network data communication rates are possible with the use of directional antennas, and in particular with phased array antennas ("PAAs"). One or more phased array antennas 34 are located on each of the simulated nodes 14. The systems based on antennas 34 have the ability to hop a beam from target to target as rapidly as 10,000 times per second, and the ability to form spatially narrow beams that reduce self-interference within the network. The node controller 36 sets the location, orientation, and velocity vector of each simulated node 14 and the relative location and orientation of each simulated antenna 34 on each simulated node 14.

Figure 2:
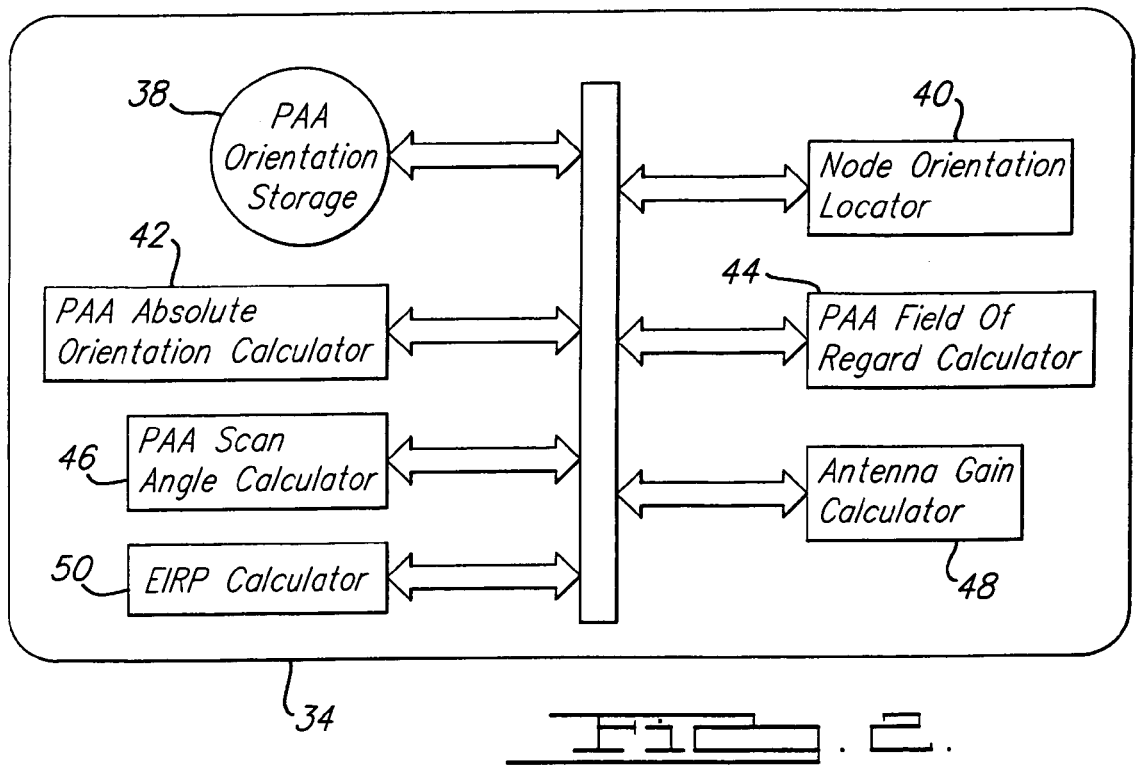
FIG. 2 is a block diagram of a simulated phased array antenna.

Referring to FIG. 2, the antennas 34 have a PAA orientation storage medium 38 for storing information about the orientation of a particular antenna 34 relative to its node platform axes. A node orientation locator 40 ascertains the orientation in space for each of the simulated nodes 14. A PAA absolute orientation calculator 42 calculates the absolute orientation for each of the antennas 34. The PAA absolute orientation calculator 42 performs the calculations for absolute orientation based on the absolute orientation of a specific simulated node 14 and relative orientation of each of the antenna 34 relative to that specific simulated node 14. A PAA "field-of-regard" finder 44 locates the antenna 34 on a given simulated node 14 having other simulated nodes 14 within its field-of-regard. A PAA scan angle calculator 46 computes the scan angle at which an antenna 34 must operate to point its beam at a particular simulated node 14. An antenna gain calculator 48 computes the antenna gain of a selected antenna 34 in the direction of one of the simulated nodes 14, where that simulated node 14 is not the target of the beam of the selected antenna 34.

With further reference to FIG. 1, TDMA links 18 provide TDMA communication channels between the simulated nodes 14. The TDMA links include time slots 52. The TDMA links 18 further comprise beam-hopping TDMA type links. The node controller 36 simulates the process by which a simulated node 14 discovers its neighboring simulated nodes 14 as well as attributes of those neighboring simulated nodes 14. The TDMA link controller 22 executes computations used by the simulated node 14 to select the TDMA links 18 to form with the other simulated nodes 14, and the initial slots 52 to use in each of the TDMA links 18 to be formed. The controller 22 controls the number of slots 52 by adding or decreasing the number of slots 52 as the traffic increases or decreases. The controller 22 initiates a mechanism to transmit link negotiation messages and slot negotiation messages between the simulated nodes 14.

At the start of simulation, the synchronous link controller 20 sets up initial parameters for the synchronous links 16. The controller 20 executes computations that a given simulated node 14 uses to select the proper synchronous links to form. The controller 20 initiates a mechanism to transmit link negotiation messages.

The link censor 24 computes the estimated interference likely to be caused by the proposed links to be formed. The link censor 24 simulates the propagation of location data and frequency assignment data among all the simulated nodes 14. The link censor 24 uses the location data together with data from the antenna gain calculator 48 to determine which of the proposed links will cause unacceptable interference with other links, and then censors, or blocks, formation of the proposed links that cause unacceptable interference.

A data traffic model 28 is specified by the user and is used to simulate the operational environment for the network 12. The model 28 is stored in a memory 26. To form the model 28, the user specifies the quantity of data moving from the simulated nodes 14 functioning as sources to the other simulated nodes 14 functioning as sinks. The user further specifies a routing protocol at each of the simulated nodes 14 for determining the needed relay simulated nodes 14 for data streams starting from the simulated nodes 14 functioning as sources to the other simulated nodes 14 functioning as sinks. The model 28 is applied to the network 12 to form a simulation of a network operating under the operational environment specified by the model 28.

With further reference to FIG. 1, a network analyzer 30 analyzes the network traffic after the model 28 is applied to the network 12. The network analyzer 30 also computes the required network parameters. The network analyzer 30 then sums all data volumes from the bytes and packets that are assigned by a user specified routing protocol to each of the simulated nodes 14 and flowing in each direction along the synchronous links 16 and TDMA links 18. The network analyzer 30 also computes the total interference for each of the synchronous links 16 and the TDMA links 18.

The network analyzer 30 further computes the total latency, including the slotting latency, for each route in the network, wherein a given route comprises at least a pair of simulated nodes 14 and one or more interconnecting synchronous links 16 or TDMA links 18. The network analyzer 30 computes the average (and/or worst case) slotting latency for each of the TDMA links 18, the sum of slotting latencies for all the TDMA links 18 and synchronous links 16 along each route and the sum of total latencies for all TDMA links 18 along each route. The data traffic model 28 is configurable by the user to set the processing delay by providing a user defined function in the software. Such a user defined function can be constant for all the simulated nodes 14 or may be a function of traffic load and/or hardware on each of the simulated nodes 14.

Figure 3:
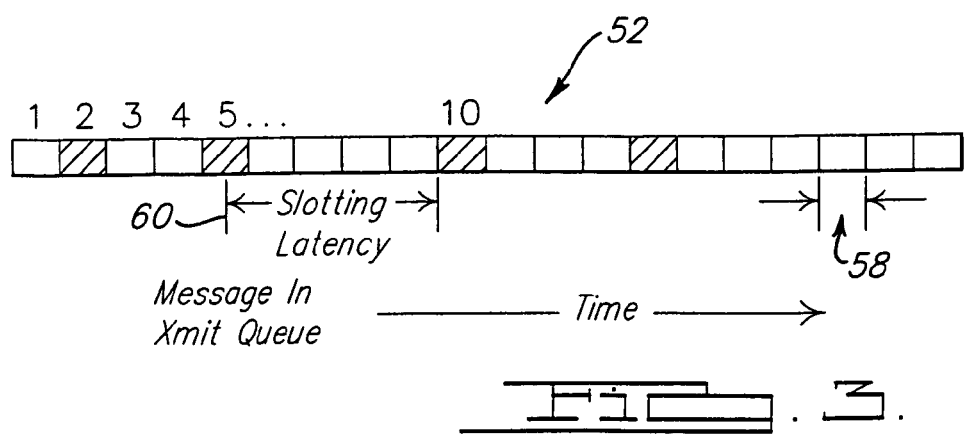
FIG. 3 is a representation of the slotting latency.

Referring to FIG. 3, the slotting latency is the delay between a message reaching the top of the transmit queue for the TDMA link 18 and the beginning of the next outgoing burst for that TDMA link 18. For example, if the message in the transmit queue of a TDMA link reaches the top of its transmit queue at top 60, i.e., midway within slot number 5 (approximately at the 4.4 slot position), then it cannot be transmitted until the beginning of slot number 10, assuming that that the next burst for the TDMA link begins at slot number 10. The slotting delay is calculated as the product of 4.6 and slot duration 54. The average slotting latency for a link is the length of a TDMA cycle divided by the number of slots allocated to that link in each cycle. Total latency for each route is the sum of slotting latency along every link in the route, time of flight along every link in the route, and the processing delay at every one of the simulated nodes 14 in the route.

The network analyzer 30 determines the actual PAA beam pattern for each of the synchronous links 16 and the TDMA links 18 used in the network 12. The network analyzer 30 sums all the interference arriving at the receive end of each of the synchronous links 16 and the TDMA links 18 from every antenna 34 on the simulated nodes 14 located above the radio horizon. For the TDMA links 18, the time-of-flight information is used to compute the maximum total interference arriving during each slot 52 used by each of the TDMA links 18. The network analyzer 30 further determines the carrier signal strength at the receive end of the TDMA links 18 and computes the carrier to interference ratio for each of the TDMA links 18.

The network analyzer 30 generates selected parameters for output which are transmitted to an output mechanism 32. In a particular embodiment, the attributes of each of the synchronous links 16 and the TDMA links 18 may be shown in a color coded two-dimensional or three dimensional representation. Other color coding or graphical representation for the output could be as follows:

(1) Each of the synchronous links 16 and TDMA links 18 could be shown as a line connecting two points on a display, where the two points represent the spatial location of two of the simulated nodes 14. For bi-directional synchronous links 16 or TDMA links 18

(most of which are bi-directional), two adjacent lines could be used, one representing each direction of the link.

(2) Encoding color, brightness, and/or width of each line to represent the value of any of the following: link frequency, link capacity, link data rate (absolute rate), link data load (rate relative to the capacity), interference (relative to the limit for that link), latency. For example, acceptable values of link load might be encoded as shades of blue, where the brighter blue represents higher loads, while loads exceeding the capacity might be encoded as shades of red with brighter red representing higher levels of overload.

(3) Facility to let the user specify which link attribute to display as above. For example the user could specify that color be used to indicate data load instead of using color to indicate frequency.

(4) Encoding each line as a series of dashes representing the TDMA slots 52 used by that link, with each dash showing the size and location of a burst at a particular moment in time.

(5) Turning off the display of all synchronous links 16 and TDMA links 18 except those belonging to a user specified frequency band for clarity in understanding the interference situations.

(6) Displaying the radio horizon of each of the simulated nodes 14 with horizon indicators shaped as circles centered on the locations of the simulated nodes 14, where the circle indicates the farthest location at which a receiver on the ground could receive a signal from the a given simulated node 14. This horizon indicator could help the user in understanding the interference data. When the radio horizon of two of the simulated nodes 14 touch or overlap, then those two of the simulated nodes 14 will be in radio-line-of-sight, i.e., they will be able to form a link to each other (with power permitting) and/or interfere with each other's reception of links from other simulated nodes 14. In a two dimensional map type display, the horizon circle would also indicate the altitude of the node. At higher altitudes the horizon circle would have a larger diameter.

Figure 4:
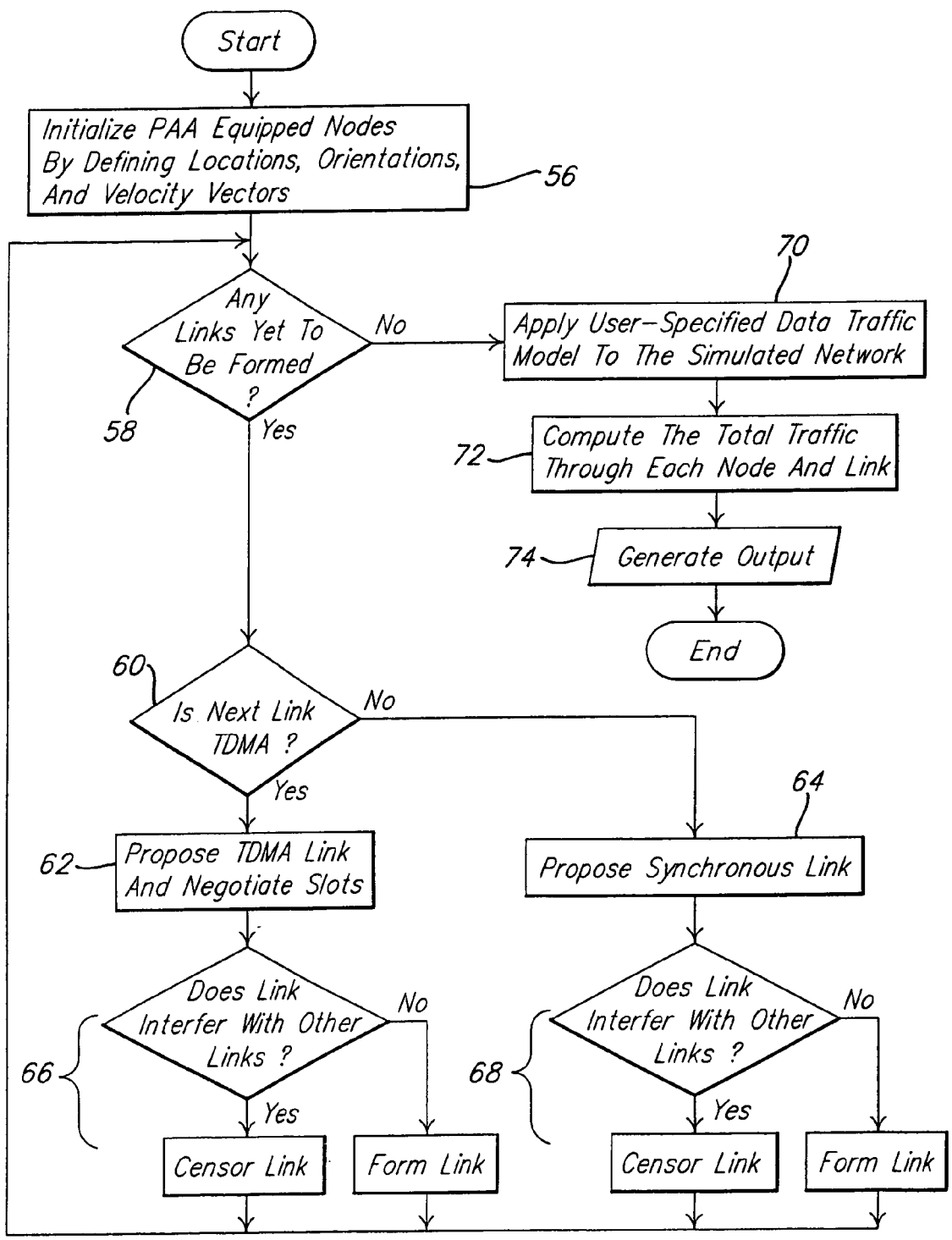
FIG. 4 is a flow-chart showing the operational steps of the simulation system shown in FIG. 1.

Referring now to FIG. 4, the method of the present invention will be described. The method involves initializing the PAA equipped nodes 14 by defining their locations, orientations, and velocity vectors as indicated in step 56. A loop is initiated, as shown in step 58, to check whether any more links are to be formed. If any more links are to be formed, the process proceeds from step 58 to step 60, otherwise the process jumps to step 70. The type of the next link to be formed is checked in step 60. If the next link to be formed is the TDMA link 18 the process branches further to step 62 otherwise to step 64 for forming the synchronous link 16. As indicated in step 2, the TDMA link 18 is proposed and the slots 52 are negotiated. At step 66, depending upon whether the proposed TDMA link 18 interferes with other links, that TDMA link 18 is either censored or is formed. Similarly, synchronous link 16 is proposed at step 64, and further in step 68, depending upon whether the proposed synchronous link 16 interferes with other links, the proposed synchronous link 16 is either censored or is formed. The user specified data traffic model 28 is next applied to the simulated network 12 in step 70. Necessary computations for the total traffic passing through each of the nodes 14, synchronous links 16 and TDMA links 18 is then performed, as shown in step 72. The desired output is generated as the final operation in step 74.

The present invention thus provides a system and method for simulating a large scale mobile network having the simulated nodes 14 thereof connected by synchronous links 16 and TDMA links 18 generated by applying a user specified data traffic model 28 to the simulated network 12. The simulated nodes 14 have phased array antennas 34 for communicating with the other simulated nodes 14.

In one of the preferred embodiments the invention is implemented as a software computer program. Another preferred embodiment implements the invention in a hardware system. While, another preferred embodiment implements the invention as a combination of hardware and software elements. Those skilled in the art will appreciate that the invention is not limited by the implementation components or methods as a invention is capable of being embodied in a variety of ways.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A simulation system for a mobile communication network comprising:
   a simulated network including:
      a plurality of nodes each having an antenna associated therewith;
      said nodes operating to communicate with one another wherein a first portion of said nodes operate to communicate by synchronous communication links and a second portion of said nodes operate to communicate by time division multiple access (TDMA) communication links;
   a user specified data traffic model in communication with said simulated network for providing operational parameters, including a routing protocol for each said node, to simulate an operational environment for said simulated network; and
   a network traffic analyzer for analyzing network traffic within said simulated network and generating an output in accordance therewith.

2. The simulation system of claim 1, wherein said network analyzer further operates to sum all radio frequency (RF) interference arriving at each said node.

3. The simulation system of claim 1, wherein said TDMA communication links comprise beam-hopping TDMA type links.

4. The simulation system of claim 1, wherein said simulated network further comprises a TDMA link controller for providing initial operating parameters for the TDMA communications links.

5. The simulation system of claim 1, wherein said simulated network further comprises a link censor for estimating a degree of interference likely to be caused by communications links to be formed in accordance with information provided by said data traffic model, said link censor blocking the formation of said synchronous communication links and said TDMA communication links likely to cause unacceptable interference to other said synchronous communication links and said TDMA communication links in said simulated network.

6. The simulation system of claim 1, wherein said simulated network further comprises a synchronous link controller for providing initial operating parameters for the synchronous links at a start of a network simulation operation.

7. The simulation system of claim 1, wherein said simulated network further comprises a node controller in communication with at least one of said nodes for setting a location, orientation and velocity vectors of each of said nodes, and the relative location and orientation of each said antenna on said nodes.

8. A method for simulating a mobile communication network, said method comprising the steps of:
- a) providing a simulated network having a plurality of nodes, wherein each said node includes an antenna associated therewith;
- b) forming a plurality of time division multiple access (TDMA) communication links between selected first pairs of said nodes, each of said TDMA communication links having a plurality of time slots;
- c) forming a plurality of synchronous communication links between selected second pairs of said nodes;
- d) using a user specified data traffic model to apply desired operating parameters to said simulated network; and
- e) using a network traffic analyzer to analyze network traffic within said simulated network and generate an output in accordance therewith.

9. The method of claim 8, further comprising the step of using a synchronous link controller for providing initial operating parameters for the synchronous communication links at a start of a network simulation operation.

10. The method of claim 8, further comprising the step of using a TDMA link controller for providing initial operating parameters for the TDMA communications links.

11. The simulation system of claim 1, wherein said simulated antenna is a simulated directional antenna.

12. The simulation system of claim 11, wherein said simulated directional antenna is a simulated phased array antenna.

* * * * *